United States Patent [19]

Hursey

[11] Patent Number: 4,624,057
[45] Date of Patent: Nov. 25, 1986

[54] METHOD AND TEMPLATE FOR CIRCLE LAYOUTS

[76] Inventor: William A. Hursey, 502 West Canal St., Picayune, Miss. 39466

[21] Appl. No.: 763,017

[22] Filed: Aug. 6, 1985

[51] Int. Cl.⁴ .......................... B23Q 1/16; B27C 5/10
[52] U.S. Cl. ...................................... 33/570; 33/27.01; 33/30.1
[58] Field of Search ................ 33/570, 562, 563, 565, 33/27 R, 27 F, 27 B, 27 K, 30 R, 30 B, 30 C, 30 G

[56] References Cited

U.S. PATENT DOCUMENTS

| | | | |
|---|---|---|---|
| 967,878 | 8/1910 | Bauer | 33/19 |
| 2,369,425 | 2/1945 | Becker | 33/570 |
| 2,504,832 | 4/1950 | Groome | 33/30 R |
| 2,525,677 | 10/1950 | Holliday | 33/19 |
| 2,677,315 | 5/1954 | Hansen | 90/57 |
| 3,040,434 | 6/1962 | Yarosz | 33/570 |
| 3,237,309 | 3/1966 | Vogel | 33/30 R |
| 3,376,647 | 4/1968 | Wooley | 33/30 R |
| 3,785,245 | 1/1974 | Streander | 33/27 F |
| 3,848,865 | 11/1974 | Bird | 33/570 |
| 4,135,305 | 1/1979 | Krause | 33/570 |

Primary Examiner—Willis Little
Attorney, Agent, or Firm—Pravel, Gambrell, Hewitt & Kimball

[57] ABSTRACT

A method and apparatus for positioning matting for picture frames and the like under an oval cutter so that ovals or other configurations can be cut in the matting about the perimeter of circles of varying diameter. The positioning template comprises a first plate which slides on the base of the oval cutter and a second plate which rotates on the first plate. Holes in the first and second plates align so that an indexing peg stops rotation of the second plate at various preselected equiangular positions.

20 Claims, 7 Drawing Figures

METHOD AND TEMPLATE FOR CIRCLE LAYOUTS

FIELD OF THE INVENTION

This invention relates to the field of drafting and indexing machines or templates which position work pieces at equal radial points. More particularly, the invention is adapted to the automatic positioning of matting material for picture frames so that portions of circles and elipses can be cut in the matting about a larger circle. The invention produces a mat with a scalloped interior perimeter as a border which highlights and frames artwork.

BACKGROUND OF THE INVENTION

In the field of framing, objects such as photographs, paintings, artwork, and crafts are often mounted in a frame structure under glass for display and preservation. Additionally, matting materials of a variety of compositions, colors, and textures are used as a border between the object displayed and the frame structure in order to highlight and augment certain qualities of the displayed object. The ability to select aesthetically pleasing and unique combinations of colors, shapes, and textures of matting and framing material to highlight the object for display is a key factor for success in the competitive business of framing. Consequently, the selection and cutting of matting into unique shapes has become a highly developed art.

A new popular and unusual matting configuration involves the use of multiple circles and elipses positioned about a larger circle rather than straight lines and square corners. Typically, the final framing configuration has oval or elliptical scalloped shapes cut in the perimeter of multiple layers of matting proximate to the artwork. This configuration is especially useful where the displayed artwork is of an unusual shape. For example, crocheted doillies can involve numerous combinations of triangular, elliptical, or circular shapes. However, this configuration has also become popular for use in framing standard square artwork. It should be noted that regardless of the artwork used, each combination of artwork and matting generally requires a different matting layout to achieve the most pleasing aesthetic effect.

Currently available oval cutters cut single circles or ovals in matting about a fixed center. An example of such an oval cutter is currently marketed by the 3M Corporation of Minneapolis, Minn. as the C & H Oval Master. The use of such machines to cut ovals about a larger circle requires the operator to manually reposition the matting under the cutter for each scalloped cut without any reference. This makes the cutting of a scalloped configuration virtually impossible, results in considerable error, and often results in a visually imperfect product. To attempt to cut a scalloped matting configuration in such a manner is so laborious and time consuming that the final product is so expensive it is commercially unacceptable. Yet, each piece of artwork for display requires different matting configurations with consequently new layout calculations and sizing. The time and effort involved in making new layout calculations and setting up the matting to be cut for each new piece of artwork stifles artistic creativity, greatly increases cost, eliminates accurate reproduction, and has virtually eliminated the availability of this type of decorative matting.

SUMMARY OF THE PRESENT INVENTION

The instant invention allows framing shops or individuals with limited experience to quickly and simply design and cut an unlimited variety of oval or elliptical scalloped shapes in the perimeters of matting. The operator can visually size the width of the most aesthetically pleasing border for each scallop in the perimeter of the matting in a single step. The invention further allows simple and foolproof alignment of each oval or elliptical scalloped cut to be made.

The invention provides a top rotating plate mounted on a bottom sliding plate which slides linearly with respect to the oval cutter or cutting tool to be used. Indexing stops are provided in the rotating plate which correspond to a numbered stop in the bottom sliding plate.

In order to use the template thus formed, an operator selects the size of small circle or oval which best accents the perimeter of the artwork. The operator then simply chooses a frame circle of large diameter by sliding the bottom plate relative to the oval cutter. The operator determines the number of elipses or circles to be cut about the perimeter of the larger framing circle and simply selects the hole or stop in the sliding bottom plate corresponding to that number. When rotated, the top rotating plate will automatically stop at the number of equidistant points about the large frame circle selected. The matting placed on the top rotating plate will therefore be properly positioned under the knife of the oval cutter so that each individual circular or oval scalloped shape about the large frame circle can in turn be cut.

The template of the instant invention eliminates previous inaccurate and time consuming methods of cutting multiple ovals and circles on picture frame matting and creates new dimensions in the variety of scalloped shapes which can be cut. The template allows an unskilled operator to quickly and accurately size the matting configuration best suited to the artwork and select the desired number of ovals or circles to be cut without complicated calculations. The matting can then be positioned, cut, and accurately reproduced at any time without error or waste.

It is therefore an object of this invention to provide a template which is simple to construct and which can be easily adapted for use with oval cutters of existing design. Furthermore, it is an object of this invention to provide a simple, foolproof method and apparatus for determining the most aesthetic dimensions of matting configurations and positioning matting for cutting those configurations without calculation or error.

BRIEF DESCRIPTION OF THE DRAWINGS

For a further understanding of the nature and objects of the present invention, reference should be had to the following detailed description, taken in conjunction with the accompanying drawings in which the parts are given like reference numerals and wherein.

DETAILED DESCRIPTION OF THE PREFERRED EMBODIMENT

Figure 1:
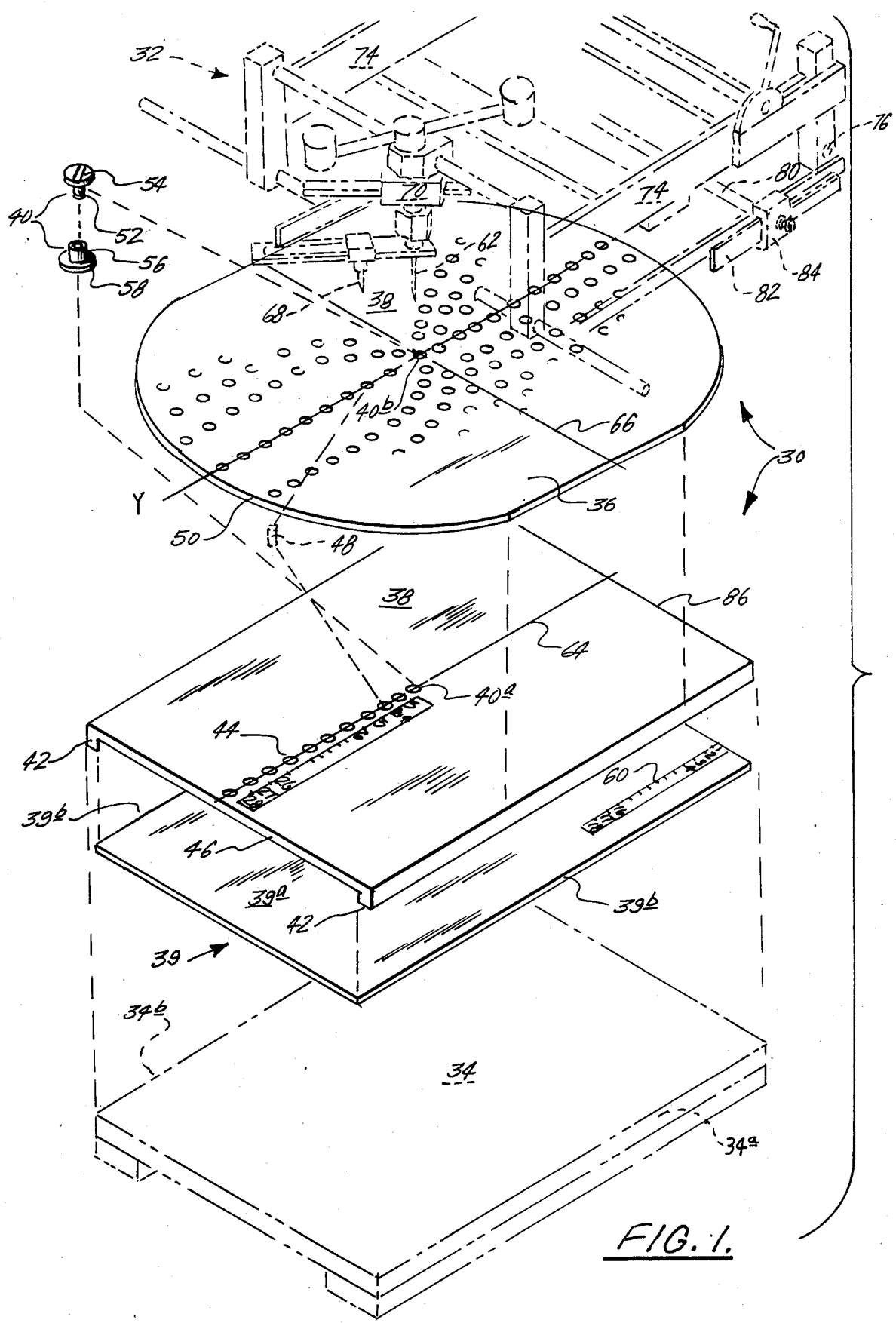
FIG. 1 is a perspective exploded view of the rotating plate, sliding plate, and centering plate of the template of this invention with a conventional oval cutter (phantom)
Figure 2:
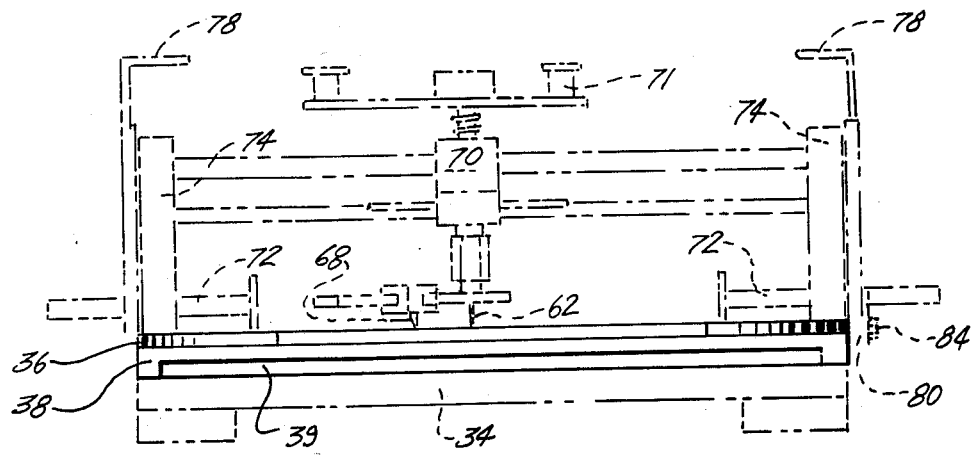
FIG. 2 is a front view of the sliding plate, rotating plate, and oval cutter (phantom)
Figure 3:
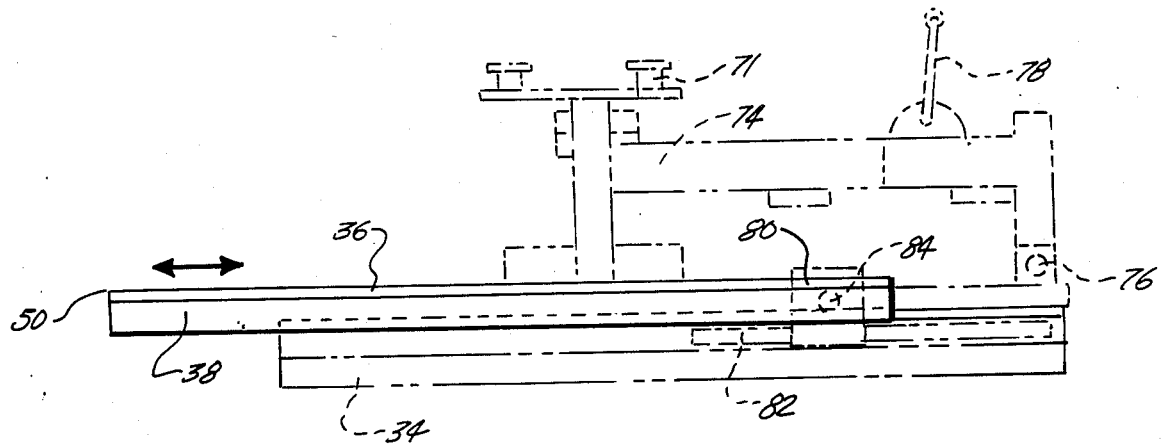
FIG. 3 is a side view of FIG. 2.
Figure 6:
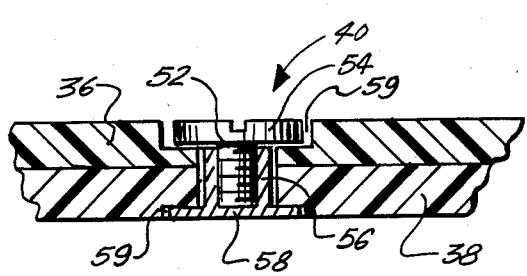
FIG. 6 is a cross sectional view of the sliding plate, rotating plate and center pivot screw.

Referring to FIG. 1, the template generally designated as 30 is intended to be used with oval cutter 32. The template 30 is shown in exploded view in FIG. 1, but in use it is an assembly mounted together as in FIGS. 2 and 3. The template 30 comprises a rotating plate 36 and a sliding plate 38 which are pivotally joined by center pivot screw 40, FIGS. 1 and 6. A centering plate 39 mounted on the oval cutter base 34 provides a sliding surface 39a and aligning edge surfaces 39b for the sliding plate 38. The configuration of the oval cutter 32 and oval cutter base 34 are such that the rotating plate 36 may freely rotate about center pivot screw 40 relative to the sliding plate 38 when the template 30 is assembled and mounted on the base 34.

In the preferred embodiment, alignment guides 42 are formed on the sliding plate 38 which allow the sliding plate 38 to move linearly along aligning edge surfaces 39b of the centering plate 39. Centering Plate 39 is generally parallel to the edge 34a, 34b of base 34. Alignment guides 42 may be made of straight strips of material mounted with adhesive to the bottom of the sliding plate 38 so that they slide along edge surfaces 39b of center plate 39. Note that the width of centering plate 39 is less than base 34 (FIG. 2) so that edge surfaces 39b are set inwardly from the edges 34a and 34b of cutter base 34. Thus, the combination of the alignment guides 42 and aligning edge surfaces 39b do not protrude past the edges 34a, 34b of the cutter base 34 in order to provide a composite template edge surface.

A line of holes 44 in the sliding plate 38 extends linearly from center pivot hole 40a to the front edge 46 of sliding plate 38 parallel to alignment guides 42. Twenty-eight holes are contemplated in the line of holes 44 as illustrated, however, not all holes are illustrated in the line of holes 44 due to size and space limitations of the drawings. Each hole in the line of holes 44 is numbered consecutively from 3 to 28. Each hole represents the number of equal radial divisions in a corresponding imaginary circle on the rotating plate 36. The circles are referred to as "imaginary" because their perimeter is not readily apparent upon viewing the holes in the rotating plate 36. Each "imaginary circle" is centered around hole 40b in rotating plate 36. Each hole in the line of holes 44 acts as a potential indexing stop for holes in the corresponding imaginary circle of rotating plate 36 when an appropriate peg 48 is placed therein.

The rotating plate 36 is elongated in shape with rounded ends as shown, but may be made of any shape such as a square or circle. The rotating plate 36 is provided with a number of holes which lie on the perimeter or circumference of the imaginary circles described above. Again, note that FIG. 1 does not illustrate all the holes in the rotating plate 36 or sliding plate 38 due to their number and space limitations in the drawing. A complete set of holes in the rotating plate 36 and sliding plate 38 may be placed in the rotating plate 36 and sliding plate 38 according to instructions as set forth herein.

A certain number of holes in rotating plate 36 correspond with each hole in the line of holes 44 in sliding plate 38. Each hole in rotating plate 36 lies equally spaced about the perimeter of a particular imaginary circle with its center at center pivot hole 40(b). A number of imaginary circles, each of successively smaller diameter, each centered about pivot hole 40(b), and each having successively fewer holes in its perimeter, are located on the rotating plate 36. The perimeter of each successively smaller imaginary circle on rotating plate 36 corresponds to a successive hole in the line of holes 44 in sliding plate 38 which is nearer center pivot hole 40b. In other words, each imaginary circle on rotating plate 36 has a radius equal to the distance one particular hole in the line of holes 44 is away from the center pivot hole 40(b).

For example, the number of holes on the perimeter of the imaginary circle on the rotating plate 36 which corresponds or passes through the hole designated as No. 2+4 in the line of holes 44 on sliding plate 38 has four holes equally spaced about its perimeter or circumference. Hole 2+4 is designated as "2+4" because only two of the four holes may be cut to form ovals 90° apart. Space considerations near the center of the rotaring plate 36 make the use of the No. 4 hole to cut ovals 90° or 180° apart more practical. Each of those four holes in rotating plate 36 line up with the hole designated as No. 2+4 in the line of holes 44 in sliding plate 38. A peg or stop 48 can be inserted into hole No. 2+4 in the sliding plate 38 which consecutively engages each hole in the perimeter of the imaginary circle that passes through hole No. 2+4. This allows the rotating plate 36 to stop at hole No. 2+4 in the sliding plate 38 when the rotating plate 36 is rotated so that the rotation of rotating plate 36 is divided into four equal portions.

Certain holes in the line of holes 44 may be marked with the number of degrees which the rotating plate 36 will rotate between stops for the convenience of the operator, in addition to a number indicating the number of times the rotating plate 36 will stop. For example, hole No. 2+4 may also be marked as 90 degrees since the rotating plate 36 will stop at four points 90 degrees apart if the indexing peg or stop 48 is placed in hole No. 2+4 in the line of holes 44.

For each hole in the line of holes 44 on the sliding plate 38, there is an imaginary circle on the rotating plate 36 in which the holes are equally spaced about its circumference or perimeter. The number of holes in the perimeter of each imaginary circle is designated by the number associated with each hole in the line of holes 44 on the sliding plate 38. Thus, an imaginary circle on the rotating plate 36 whose perimeter passes through a hole marked 3 on sliding plate 38 would have three holes equi-radially spaced about its perimeter, thus dividing rotation of plate 36 into three equal parts. At hole number 18, as designated on the line of holes 44 on sliding plate 18, a corresponding imaginary circle on rotating plate 36 would have 18 holes equi-radially spaced about its perimeter. Each successive hole in the line of holes 44 further away from the center pivot screw 40 on sliding plate 38 would line up with the perimeter or circumference of a successively larger imaginary circle on rotating plate 36. Each successively larger imaginary circle and corresponding successive hole in the line of holes 44 would combine to divide rotation of plate 36 into a successively greater number of parts.

An indexing peg or stud 48 as illustrated in FIG. 1 is used to stop rotating plate 36 from rotating about center pivot screw 40 when a hole in the rotating plate 36 and sliding plate 38 line up. The peg 48 is preferably a threaded allen screw. An allen screw is preferred because there is no head on the screw so the top of the allen screw (peg 48) can penetrate any hole in the rotating plate 36. Each hole in the line of holes 44 is threaded to accommodate the allen screw (peg 48). The allen screw (peg 48) may be inserted into the sliding plate 38 by sliding the sliding plate 38 forward (away from the oval cutter 32) so that the hole in the line of holes 44 into which the allen screw is to be inserted is clear of the oval cutter base 34 and centering plate 39.

The allen screw (peg 48) may then be inserted from below the sliding plate 38 by the operator with an allen wrench and screwed into a selected hole in the line of holes 44. The allen screw (peg 48) should be inserted into a hole in the line of holes 44 so that it protrudes above the surface of the sliding plate 38. Thus, the allen screw (peg 48) will protrude into any corresponding hole in the rotating plate 36. The allen screw (peg 48) should be of such a length that it will not protrude above the upper surface of the rotating plate 36. This will prevent interference with matting or other objects on the upper surface of the rotating plate 36.

Once peg 48 is inserted into a hole in the line of holes 44, the rotating plate 36 is rotated until a hole in an imaginary circle on the rotating plate 36 lines up with the peg 48 so that the peg 48 protrudes into that hole. This prevents rotating plate 36 from rotating. Rotating plate 36 may be further rotated to the next equidistant hole about the circumference of the corresponding imaginary circle on rotating plate 36 by lifting the edge 50 of rotating plate 36 slightly so that peg 48 no longer protrudes into a hole on rotating plate 36. Rotating plate 36 may then be rotated. If edge 50 is then allowed to rest on the sliding plate 38 or peg 48, it may be rotated until peg 48 aligns with and protrudes into the next hole in the circumference of the same imaginary circle on rotating plate 36.

Rotating plate 36 is preferably made of a flexible material such as plexiglass so that its edge can be lifted vertically with respect to its center. This allows holes in the rotating plate 36 to disengage from peg 48. Additionally, some vertical movement may be allowed by the center pivot screw 40 would allow holes in the rotating plate 36 to disengage from peg 48. Center pivot screw 40 is preferably made of two parts, one part comprising a threaded shaft 52 with a flange 54 on one end and the other part comprising an internally threaded shaft 56 with a flange 58 on one end. The flanges 54, 58 engage recesses 59 (FIG. 6) in the top of the rotating plate 36 and bottom of the sliding plate 38. The shafts 52, 56 extend through the center pivot hole 40b in the rotating plate 36 and center pivot hole 40a in the sliding plate 38 in opposed fashion and threadably engage each other. Preferably, the length of the shaft 56 is greater than the combined thickness of the recessed portion of sliding plate 38 and rotating plate 36 so that there is some space remaining to allow vertical movement of rotary plate 36 so it may be disengaged from peg 48. Note that the length of shaft 56 should also be such that the flange 54 does not protrude above the surface of the rotating plate 36 so materials can freely slide across the rotating plate 36 and sliding plate 38 can freely slide across the centering plate 39.

The centering plate 39 is referred to as a centering plate because a line of numbers 60 on the centering plate allow the center pivot screw 44 to center under the point 62 of the oval cutter 32. The line of numbers 60 denote length in inches from the edge of the centering plate 39. The centering plate 39 is secured to the oval cutter base 34 so that the number zero on the line of numbers 60 lines up with the rear of the sliding plate 38 when the center point 62 of the oval cutter 32 is centered over center pivot screw 44. The line of numbers 60 therefore indicates the number of inches the center pivot point 62 is from the center pivot screw 44 so that a border of particular dimension between artwork and matting can be determined.

With respect to construction, the holes in the rotating plate 36 are laid out in a simple geometric fashion. For example, the inner imaginary circle has three holes spaced 120° apart. The next larger imaginary circle has four holes spaced 90° apart. The next larger circle has five holes spaced 72° apart and so on, until space on the rotating plate 36 will not accommodate more imaginary circles of holes. The holes in each imaginary circle should be spaced away from and begin on a single radial line of reference stemming from center pivot hole 40b. That line of reference Y is formed by holes which are on the perimeter of each imaginary circle in rotating plate 36. In the completed rotating plate 36, the reference line of holes Y is readily apparent and the holes in the imaginary circles on the rotating plate 36 line up along certain linear radial lines 66 and Y which intersect at 90°. While the lines 66 and Y are not readily apparent from the drawings due to the large number of holes in the rotating plate 36, these reference lines of linear holes are more readily apparent upon construction of the rotating plate 36. Note that line of holes 44 also form a linear base line 64 which bisects the sliding plate 38. When the base line 64 is aligned with the line of holes representing line Y on the rotating plate 36 the holes in each line of holes (44 and Y) will align. The aligned positions of the sliding plate 38 and rotating plate 36 along base line 64 and line Y is useful as a reference and will be referred to as the base position of the rotating plate 36.

The use of reference lines on the rotating plate 36 has also proven helpful for positioning matting on the rotating plate 36. Base line 64 and line 66 perpendicular thereto through the center pivot hole 40a may be marked as lines on the rotating plate 36 by appropriate means. Further matting reference lines which bisect the four quadrants formed by base line 62 and line 66 may be added to aid in centering square matting on the rotating plate 36. A protective surface, preferably of a self-healing type, may also be placed on the upper work surface of rotating plate 36 to protect that surface from being cut by a knife 68 during normal mat cutting operations. The protective surface may have reference lines for centering matting as described above for the rotating plate 36.

Before describing the manner in which the template 30 is used, a brief description of the operation of the oval cutter 32 may be helpful. The oval cutter 32 is designed to cut ovals or circles about a fixed point by means of an offset gear mechanism 70 well known in the art. As handles 71 are turned, the gear mechanism 70 rotates knife 68 about pointer 62. The oval cutter 32 has feet 72 connected to a frame 74 which engage the mat material 67 to be cut and hold it firmly in position during cutting. The frame 74 of the oval cutter 32 pivots at a point 76 (FIG. 3), so that the feet 72 and knife 68 can be raised and lowered from the mat by handles 78. This allows the mat material 67 and the template 30 to be rotated and repositioned for each cut.

Pointer 62 does not contact the material to be cut and defines the center of a circle to be cut by oval cutter 32 when the oval cutter 32 is adjusted in such manner as to cut a circle. When the oval cutter is set to cut an oval, the pointer 62 moves along a linear portion of the major and minor diametric axis of the oval (lines x1 and y1 in FIG. 4). Normally, pointer 62 is aligned so that the point or major axis it scribes is directly above base line 64 during each cut. Normally, the knife 68 is rotated to the rear of the oval cutter 32 to cut the first oval, such that it is also directly above line 64 and reference line y. This position of the pointer 62 and knife 68 will be referred to as the base position of the oval cutter. When the sliding plate 38, rotating plate 36, and oval cutter 32 are in their base positions, the template 38 is in its starting position.

The oval cutter 32 also has a side bar 80 which slideably attaches to rail 82. Rail 82 is in turn attached to the side 34a of oval cutter base 34. Side bar 80 can slide in the same direction as the sliding plate 38 and may be locked in position by a threaded screw 84. Side bar 80 extends over the surface of the centering plate 39 so as to engage the rear 86 of the sliding plate 38. Side bar 80 may therefore be used as a linear stop for sliding plate 38 so that the sliding plate 38 may be repositioned without reference to the line of numbers 60 on centering plate 39.

In practice, the template is simple and efficient to use in combination with an oval cutter 32. Initially, the major and minor diameter of the oval (designated by lines X1 and Y1 in FIG. 4), or the diameter of the circle, which best accents the artwork is chosen to form the scallops in the inner perimeter of the matting. For example, the doilly 90 illustrated in FIG. 7 has 8 "points" about its perimeter. An operator might determine that a portion of an oval of a particular major and minor diameter would best accent each point. The template 30 is placed in the start position. The oval cutter 32 is then set to cut an oval of those dimensions above a particular point on reference line Y on the rotating plate 36.

For purposes of further explanation, in the start position, the oval cutter 32 is set to cut an oval of particular dimension. Preferably, the major diameter of the oval along line Y1 should be aligned with base line 64 and line Y. The major diameter of the oval to be cut may be aligned with reference line Y with the aid of reference lines marked on the rotary plate 36. However, note that other orientations may be proper in different artistic settings.

Next, the most aesthetic border for the artwork is determined. The border is the distance between the artwork and the inner perimeter of the matting when the artwork is positioned for display. The width of the border may be determined visually or by measurement. The oval cutter 32 and template 30 are placed in the starting position. The artwork is then placed on the rotating plate 36 and centered over center pivot screw 40 with the aid of reference lines Y, 66, or other reference lines marked on the rotating plate 36. It is helpful if the artwork is placed on the rotating plate 36 so that a point on the artwork which is intended to align with the point of maximum cut on the matting is aligned on reference line Y. The point of maximum cut on the matting is generally the point at which the artwork extends the furthest radial distance from the center of rotating plate 36, i.e. center pivot hole 40b. With respect to the artwork in FIGS. 5 and 7, this position would be at one of the 8 "points" of the doillie.

The most aesthetic border may then be determined visually as the distance between the knife 52 and the perimeter of the artwork along a radius from center pivot hole 40b. The sliding plate 38 may be moved linearly toward or away from the knife 52 (i.e., forward or backward) to adjust the width of the border. Once the proper border is selected, the side bar 80 may be slid to a position in contact with the rear edge 86 of the sliding plate 38 and locked. This marks the width of the border for reference should the sliding plate 38 be moved during operation. The artwork may then be removed from the template.

The border may also be determined by measurement. Fdor example, if a two inch border is required on artwork with a ten inch outside maximum radius, a ruler may be used to measure twelve inches between the knife 68 of the oval cutter 32 in the base position and the center of the rotating plate 36. Alternatively, the line of numbers 60 may be used in combination with half the major diameter of the oval to determine the border. For example, assume a two inch border is desired on artwork of ten inch radius where an oval of six inch major diameter is used. Half the diameter of the oval (three inches) would be subtracted from the sum of the radius of the artwork (ten inches) and the width of the border (two inches). The result equals nine inches. The sliding plate 36 could then be adjusted so that the rear edge 86 of the sliding plate 38 lines up with the result (nine inches) on the line of numbers 60. Note that in determining a border width by any method, the operator is actually determining the diameter of the frame circle 88 (FIG. 5) about which the desired oval or circular shapes are cut.

Next, the number of "points" or scalloped portions of ovals to be cut in the matting 67 to form a perimeter to frame the artwork may be determined. As previously noted, the artwork 90 in FIG. 7 has 8 "points" which the operator has chosen to correspond to the upper portions of 10 ovals to be cut in the inner perimeter of the matting. Thus, a peg 48 is placed in hole No. 10 in the line of holes 44 in sliding plate 38. This may be done by sliding the plate 38 to a position such that a portion of the bottom of sliding plate 38 is exposed beyond the base 34 so the peg 48 may be inserted from the bottom of sliding plate 38. Alternatively, the peg 48 may be positioned by lining up holes in the sliding plate 38 and rotating plate 36 and inserting the peg 48 into the sliding plate 38 through holes in the rotating plate 36. The rotating plate 36 is then rotated until one of the 8 holes in a corresponding imaginary circle aligns with and locks on the peg 48. Note that the center of each oval to be cut forms an imaginary frame circle 88. Preferably this hole will be the one on reference line Y so that the rotating plate 36 is in the base position about center pivot hole 40b as each consecutive oval is cut. Also note that when the ovals are cut on the frame circle, FIGS. 4 and 5 that only the upper portions of the ovals create the actual inner scalloped perimeter of the matting desired. This is because inner portions of the ovals are eventually cut away and discarded in the final product.

Figure 4:
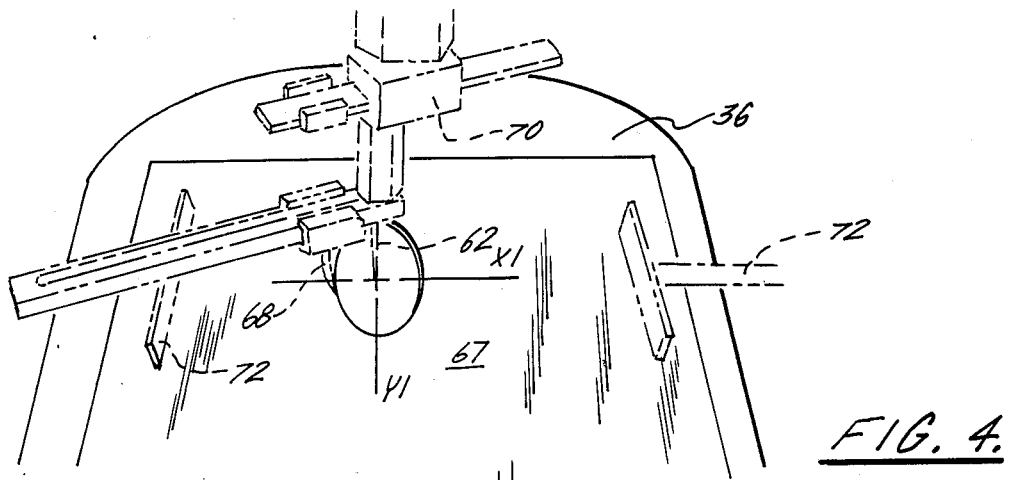
FIG. 4 illustrates the oval cutter and template after a single oval scalloped shape has been cut about a large frame circle.
Figure 5:
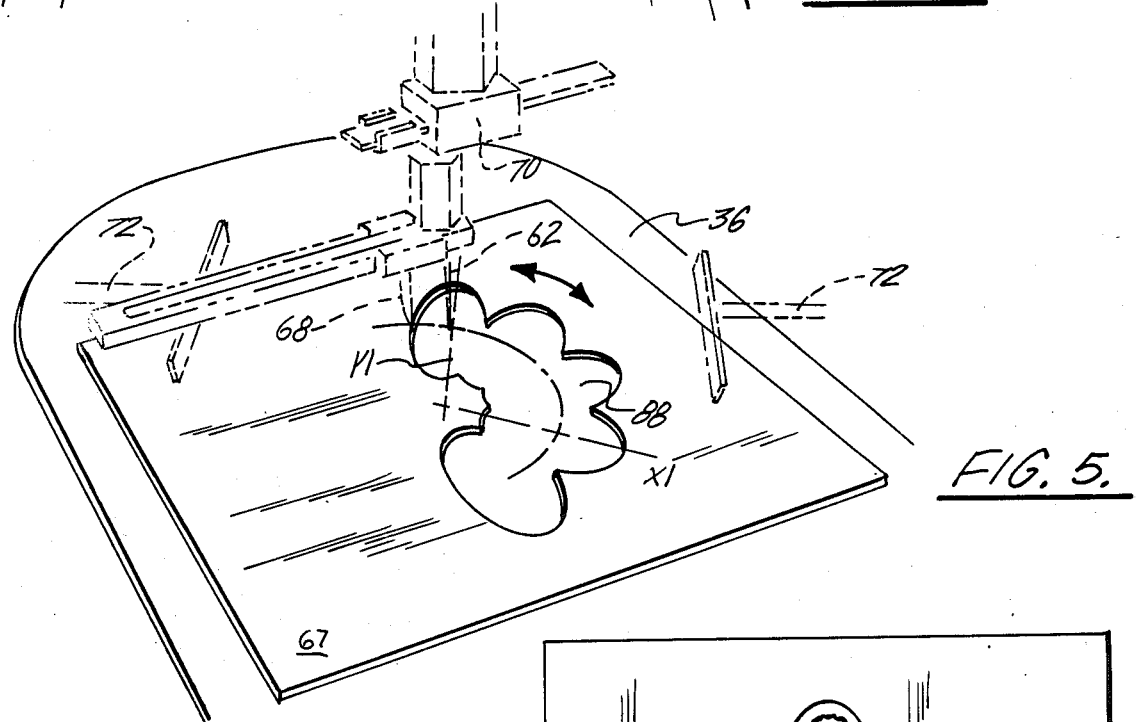
FIG. 5 illustrates the oval cutter and template after five scalloped shapes have been cut on the large frame circle and the inner perimeter of the matting.

Finally, the matting 67 is placed on the rotating plate 36 so that is centered about center pivot hole 40b with the aid of reference lines Y and 66. The matting 67 may be secured to the rotating plate 36 by suitable means such as double face tape. The knife 68 and feet 72 of oval cutter 32 may then be lowered to engage the matting and the first oval may be cut (FIG. 4). The knife 52 and feet 72 are then raised and the rotary plate 36 is rotated in the above described manner until the next hole is engaged by peg 48 in the appropriate imaginary circle. FIG. 5 illustrates the mat after 5 ovals have been cut in the mat. This process is repeated until all the ovals or circles have been cut. Each time the rotating plate 36 is rotated, it simply and precisely positions the matting 67 so that the next oval can be cut. Note that each time an oval is cut, its mat or diameter aligns with base line 64.

When all the ovals have been cut the center portions of the ovals and the matting 67 within the frame circle 88 is removed. The inner perimeter of the matting is formed by the upper portions of the ovals as they intersect with consecutive ovals around the frame circle 88.

Figure 7:
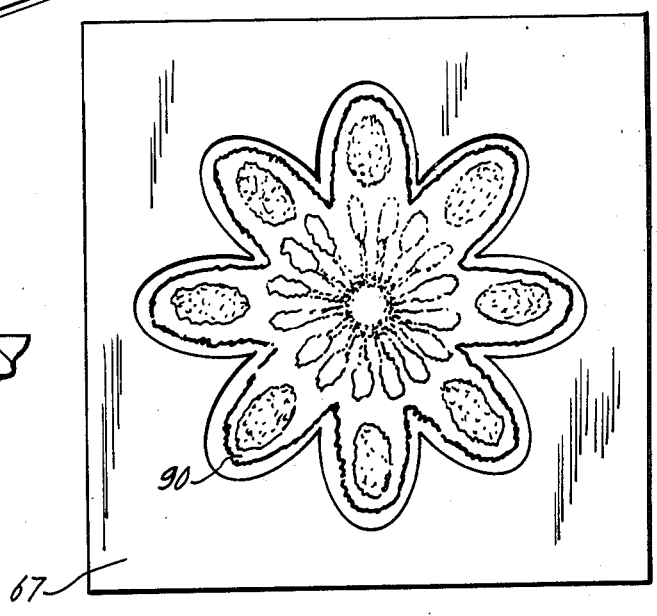
FIG. 7 is an illustration of the artwork and complementary matting configurations which can be produced with this invention.

When the operator has sequentially cut each scalloped shape about the circumference of the frame circle the matting 67 may be removed from the rotating plate 36 for mounting in a frame. The artwork 90 may then be decoratively placed within the border defined by the matting 67 for display (FIG. 7).

Based on an understanding of the operation of the template disclosed, it is clear that the template can be made of a number of satisfactory materials. The template 30 is preferably made of transparent material such as plexiglass so that numerical designations marking the line of holes 44 of sliding plate 38 can be seen through rotating plate 36. It should also be understood that the holes on the sliding plate 38 and rotating plate 36 may be placed on either plate in corresponding fashion. Furthermore, the number of imaginary circles with equidistant holes spaced about their perimeter on rotating plate 36 may be limited as necessary, or as space requires.

While the method and apparatus of the invention is described above, many other variations will occur to those skilled in the art. It is intended that all such variations which fall within the scope of the appended claims be embraced thereby.

I claim:

1. An indexing template for positioning a work piece with respect to a tool comprising:
 a. a base;
 b. a lower plate slidably positioned upon the base;
 c. an upper plate movably connected to the lower plate;
 d. an ordered pattern of indexing points in the upper plate arranged upon a plurality of concentric circles of varying diameter;
 e. an ordered pattern of indexing points in the lower plate; and
 f. indexing means for affixing the upper and lower plates with respect to each other at preselected positions by alignment of indexing points in the lower plate with indexing points on a concentric circle in the upper plate.

2. The indexing template of claim 1 in which the indexing means affixes the upper and lower plates at equiangular positions with respect to rotation of one plate upon the other.

3. The indexing template of claim 2 in which the indexing means includes an indexing member that senses when indexing points on the upper and lower plate are aligned during rotation of one plate with respect to the other and that stops rotation of the plates at a preselected number of successive radial positions.

4. An indexing template for positioning a work piece with respect to a tool comprising:
 a. a base;
 b. a lower plate slidably positioned upon the base;
 c. an upper plate movably connected to the lower plate;
 d. an ordered pattern of openings in the upper plate arranged upon a plurality of concentric circles of successively larger diameter, each concentric circle having an increasing number of openings placed upon the perimeter of each of the concentric circles so that the larger concentric circles have more indexing openings than the smaller ones;
 e. an ordered pattern of openings in the lower plate; and
 f. indexing means for affixing the upper and lower plates at preselected equiangular positions with respect to each other and for sensing when openings on the upper and lower plate are aligned during rotation of one plate with respect to the other.

5. The indexing template of claim 4 in which the indexing means includes a peg member which engages aligned openings of the upper and lower plates.

6. The indexing apparatus of claim 4 in which the openings on one of the plates are equi-radially spaced.

7. The indexing apparatus of claim 6 wherein the openings on one of the plates are arranged in linear paths.

8. A system for positioning matting with respect to a cutter for ovals or circles so that shapes can be formed at the perimeter of circles of varying diameter comprising:
 a. a cutter means for cutting ovals or circles;
 b. a base connected to the cutter;
 c. a first plate member connected to the base so that the first plate can slide along a defined linear path and be positioned at varying distance from the cutter, said first plate having an ordered pattern of indexing points;
 d. a second plate member rotatably connected to the first member which provides a surface on which the matting material can be placed and which has an ordered pattern of indexing points arranged upon the perimeter of a series of concentric circles of successively larger diameter, each successively larger circle having an increasing number of indexing points on its perimeter; and
 e. indexing means connected to the first plate member for identifying indexing points on the second plate and for stopping rotation of the second plate member at each successive indexing point on the perimeter of a particular concentric circle so the cutter can engage the matting.

9. The system of claim 8 in which the indexing means compares the position of indexing points on the first plate member with respect to indexing points on the second member and stops rotation of the second plate member when certain points are aligned.

10. A method of positioning a work piece with respect to a tool comprising the steps of:
 a. placing the work piece on a template;
 b. sliding the template relative to the tool to determine the perimeter on which the tool will operate;
 c. rotating the template relative to the tool; and d. stopping rotation of the template at preselected points with a pre-set stop means so that the tool may be used on the work piece about the predetermined perimeter.

11. The method of claim 10 in which step (b) further comprises sliding the template linearly.

12. A method of positioning a work piece with respect to a tool comprising the steps of:
 a. placing the work piece on a template;
 b. sliding the template relative to the tool;
 c. rotating the template relative to the tool; and
 d. stopping rotation of the template at preselected points with a pre-set stop means so that the tool may be used on the work piece by placing a peg in a hole in a non-rotating portion of the template so that the peg engages a hole in a rotating portion of the template.

13. A method of positioning a work piece with respect to a tool comprising the steps of:
 a. placing the work piece on a template;
 b. sliding the template relative to the tool;
 c. determining the number of points along the perimeter of a circle about the work piece which are to be serviced by the tool;
 d. rotating the template relative to the tool; and
 e. stopping rotation of the template at preselected points with a pre-set stop means so that the tool may be used on the work piece.

14. The method of claim 13 in which step (e) further comprises the step of stopping rotation of the template with respect to the tool by selecting an element of the pre-set stop means which engages a number of other stop elements equal to the number of points determined in step (c).

15. A method of positioning a work piece with respect to a tool comprising the steps of:
 a. placing the work piece on a template;
 b. sliding the template relative to the tool;
 c. rotating the template relative to the tool; and
 d. stopping rotation of the template at preselected points with a pre-set stop means so that the tool may be used on the work piece by placing a stop element in a non-rotating portion of the template having a hole so that it engages a rotating portion of the template at preselected points.

16. The method of claim 14 in which step (c) further includes placing a side bar in position proximate to the sliding portion of the template so that the sliding portion of the template can be slid to the same position without measurement.

17. A method of positioning matting with respect to an oval cutter for cutting shapes comprising:
 a. placing the matting on a template;
 b. sliding the template relative to a tool to determine the perimeter on which the tool will operate;
 c. selecting a stop element corresponding to the number of points at which the rotation of the template is to be stopped;
 d. rotating the template relative to the tool;
 e. comparing the selected stop element to stop engaging elements; and
 f. stopping rotation of the template at a number of preselected equi-radially spaced stop engaging elements equal to the number of points previously selected.

18. An indexing template for positioning a work piece with respect to a tool comprising:
 a. a base;
 b. a first plate connected to the base, so that it can be slidably positioned along a defined linear path at a varying distance from the tool;
 c. an second plate movably connected to the first plate on which the work piece may be secured;
 d. an ordered pattern of indexing points in the second plate arranged upon a plurality of concentric circles of varying diameter, each successive concentric circle having an increasing number of indexing points spaced about its perimeter so that each concentric circle forms a reference which allows the second plate to be positioned at a preselected number of radial points;
 e. an ordered pattern of indexing points in the first plate; each indexing point aligning with a concentric circle of holes in the second plate for selecting which concentric circle will be used as a reference; and
 g. indexing means for affixing the first and second plates with respect to each other at a preselected number of radial positions by alignment of an indexing point in the first plate with the indexing points on the perimeter of a single concentric circle in the second plate, the plurality of concentric circles on the second plate allowing the second plate to be positioned at a range of radial positions depending on which concentric circle of reference is aligned with an indexing point in the first plate by the indexing means.

19. The indexing template of claim 18 in which the indexing means affixes the first and second plates at equiangular positions with respect to rotation of one plate upon the other.

20. The indexing template of claim 19 in which the indexing means includes an indexing member that senses when the indexing points on the first plate are aligned with successive indexing points on a selected concentric circle of reference on the second plate.

* * * * *